United States Patent [19]
Tsuchida

[11] Patent Number: 5,235,464
[45] Date of Patent: Aug. 10, 1993

[54] LENS SYSTEM

[75] Inventor: Hirofumi Tsuchida, Tokyo, Japan

[73] Assignee: Olympus Optical Co., Ltd., Tokyo, Japan

[21] Appl. No.: 792,659

[22] Filed: Nov. 15, 1991

[30] Foreign Application Priority Data

Nov. 17, 1990 [JP] Japan .................................. 2-310181

[51] Int. Cl.$^5$ .......................... G02B 3/00; G02B 9/00
[52] U.S. Cl. .................................... 359/652; 359/654
[58] Field of Search ........................ 359/642, 651–654, 359/737, 742, 566, 568, 570

[56] References Cited

U.S. PATENT DOCUMENTS

| | | | |
|---|---|---|---|
| 4,843,494 | 6/1989 | Cronin et al. ........................ | 359/652 |
| 5,044,706 | 9/1991 | Chen .................................... | 359/357 |
| 5,117,308 | 5/1992 | Tsuchida et al. .................. | 359/654 |
| 5,151,823 | 9/1992 | Chen .................................... | 359/520 |

FOREIGN PATENT DOCUMENTS 2-83228  3/1990  Japan .

OTHER PUBLICATIONS

Hybrid diffractive-refractive lenses and achromats, Thomas Stone et al. pp. 2960–2971 Applied Optics / vol. 27, No. 14 / Jul. 15, 1988.

Design of gradient-index lens systems for disc format cameras, J. Brian Caldwell et al. Sep. 15, 1986 / vol. 25, No. 18 / Applied Optics—pp. 3351–3355.

Design of a gradient-index photographic objective, Leland G. Atkinson et al., pp. 993–998 15 Mar. 1982 / vol. 21, No. 6 / Applied Optics.

"Infrared applications of diffractive optical elements", Swanson et al. SPIE Proceeding, vol. 885, paper #22, 1988.

Primary Examiner—Bruce Y. Arnold
Assistant Examiner—Thong Nguyen
Attorney, Agent, or Firm—Cushman, Darby & Cushman

[57] ABSTRACT

A lens system comprising a radial type graded refractive index lens element and a diffraction type lens element so that the refractive power of the radial type graded refractive index lens element is imparted to the diffraction type lens element, thereby facilitating manufacturing of the graded refractive index lens element and favorably correcting aberrations including chromatic aberration.

7 Claims, 4 Drawing Sheets

SPHERICAL ABERRATION F/2.00

SPHERICAL ABERRATION F/2.00

SPHERICAL
ABERRATION
F/2.00

-2.0   2.0

LENS SYSTEM

BACKGROUND OF THE INVENTION a) Field of the Invention

The present invention relates to a lens system which consists of a combination of one or two radial type graded refractive index lens element having a refractive index distribution in the direction perpendicular to the optical axis and one or two diffraction type lens element.

b) Description of the Prior Art

The radial type graded refractive index lens element which has a refractive index distribution in the direction perpendicular to the optical axis has very high capabilities to correct aberrations as described, for example, in the Applied Optics, Vol 21., pages 993-998. This literature clarifies that the radial type graded refractive index lens element makes it possible to compose, only of two lens elements, the conventional standard lens system for cameras which comprises six lens elements.

The radial type graded refractive index lens element has a refractive index distribution expressed by the following formula:

$$n(y) = N_0 + N_1 y^2 + N_2 y^4 + \cdots$$

wherein the reference symbol y represents the distance as measured from the optical axis to a lens portion of interest in the direction perpendicular to the optical axis, the reference symbol $n(y)$ designates the refractive index of the lens element as measured at the portion located at the radial distance y, the reference symbol $N_0$ denotes the refractive index of the lens element as measured at the portion located on the optical axis, and the reference symbols $N_1, N_2, \ldots$ represent the refractive index distribution coefficients.

The refractive index distribution coefficients of the radial type graded refractive index lens element have values which are different dependently on wavelengths. When the symbols such as d, F, C, etc. which represent wavelengths are suffixed to the refractive index distribution coefficients, for example in the forms of $N_{id}$, $N_{iF}$ and $N_{iC}$ (the refractive index distribution coefficients for the d-line, F-line and C-line respectively), the Abbe's number representing dispersion is expressed as follows:

$$\nu_i = N_{id}/(N_{iF} - N_{iC})$$

(i = 1, 2, ...)

Out of the Abbe's numbers mentioned above, $\nu_1$ represents an approximate amount of chromatic aberration to be produced by a ray which is refracted by a medium.

Further, the basic Abbe's number (Abbe's number as measured on the optical axis) $\nu_0$ is expressed by the following formula:

$$\nu_0 = (N_{0d} - 1)/(N_{0F} - N_{0C})$$

One of the high aberration correcting capabilities of the radial type graded refractive index lens element is the capability to correct chromatic aberration. Paraxial color PAC which is to be produced by the radial graded refractive index lens element is given by the following formula (i):

$$PAC = (-y_a^2/n'_{ak})(\phi_H/\nu_0 + \phi_G/V_1) \quad (i)$$

wherein the reference symbol $y_a$ represents height of ray, the reference symbol $n'_{ak}$ designates the angle of the ray emerging from the lens element relative to the optical axis, the reference symbol $\phi_H$ denotes the refractive power of the surface of the graded refractive index lens element and the reference symbol $\phi_G$ represents the refractive power of the medium of the graded refractive index lens element.

In order to allow the radial type graded refractive index lens element to fully exhibit the capability thereof for correcting chromatic aberration, it is necessary that $(\phi_H/\nu_0 + \phi_G/\nu_1)$ has a small value in the formula (i). For this purpose, $\nu_1$ must have a large value or a negative value. When $\nu_1$ has a small value, remarkable paraxial color will be produced as is understood from the formula (i).

However, it is known that the radial type graded refractive index lens element can actually be manufactured easily only with materials having small values of $\nu_1$ within a range on the order from 10 to 30. This is understood from the fact that the materials for the radial type graded refractive index lens elements which have hitherto been prepared in practice by the ion-exchange method, etc. have values of $\nu_1$ within the range mentioned above. This fact is also stated in literatures, for example, the Applied Optics, Vol 25, pages 3351-3355.

Consequently, radial type graded refractive index lens elements which can actually be manufactured easily in practice have a defect that they produce remarkable chromatic aberration.

SUMMARY OF THE INVENTION

A primary object of the present invention is to provide a lens system which uses a radial type graded refractive index lens element easily manufacturable in practice and has aberrations corrected sufficiently favorably.

The lens system according to the present invention is composed of a combination of one or two radial type graded refractive index lens element and one or two diffraction type lens element, and is designed to satisfy the following conditions (1) and (2):

$$\nu_1 < \nu_0 \quad (1)$$

$$0.01 < \Sigma\phi_D/\Sigma\phi_G < 1.2 \quad (2)$$

wherein the reference symbol $\nu_0$ represents the Abbe's number of the radial type graded refractive index lens element, the reference symbol $\nu_1$ designates the Abbe's number due to the coefficient of the second order of the radial type graded refractive index lens element, the reference symbol $\phi_G$ denotes the refractive power of the radial type graded refractive index lens element, the reference symbol $\phi_D$ represents the refractive power of the diffraction type lens element, and the reference symbol $\Sigma$ means that, when a plurality of radial type graded refractive index lens elements and/or diffraction type lens elements are used, the refractive powers of these lens elements are to be totalized.

In order that the lens system according to the present invention can be manufactured in practice, the lens system uses the radial type graded refractive index lens element which satisfies the above-mentioned condition (1). If the condition (1) is not satisfied, it will be difficult to prepare a material for manufacturing the radial type graded refractive index lens element in practice. Especially, it will be very difficult to prepare a material which has a large value of Δn, i.e. a large difference in refractive index in the radial direction of the radial type graded refractive index lens element.

$v_0$, which is the Abbe's number of the radial graded refractive index lens element as measured on the optical axis as already described above, has a value ordinarily within a range from 25 to 70. When the condition (1) is satisfied or when $v_1$ has a value smaller than that of $v_0$, very remarkable paraxial color is produced as is understood from the formula (i). When an attempt is made to correct this chromatic aberration by combining the radial type graded refractive index lens element with other lens element, at least two or three lens elements will be necessary and the lens system will comprise a large number of lens elements, thereby making insignificant the use of the radial graded refractive index lens element.

In order to correct the remarkable paraxial color described above, the lens system according to the present invention uses a diffraction type lens element.

The diffraction type lens element has, for example, concentrical patterns formed thereon as described in literatures such as the Applied Optics, Vol. 27, pages 2960–2970 (1988), and functions as a lens by utilizing diffraction of rays. According to this literature, the diffraction type lens element has an Abbe's number of −3.45 and a very powerful capability to correct the chromatic aberration.

The lens system, which is designed as the combination of the radial type graded refractive index lens element and the diffraction type lens element, satisfies the above-mentioned condition (2).

The condition (2) is adopted for favorably correcting the paraxial color. If the lower limit of the condition (2) is exceeded, the diffraction type lens element will have too weak a power to correct the chromatic aberration sufficiently. If the upper limit of the condition (2) is exceeded, the diffraction type lens element will have a power strong enough to overcorrect the paraxial color and, the concentrical patterns must undesirably be formed at too narrow pitches on the diffraction type lens element, thereby making it difficult to manufacture this lens element in practice.

For composing the lens system according to the present invention which consists of the combination of the radial type graded refractive index lens element and the diffraction type lens element, it is possible to combine the radial type graded refractive index lens element and the diffraction type lens element which are manufactured separately, or to form the diffraction type lens element on a surface of the radial type graded refractive index lens element.

Though Japanese Patent Kokai Publication No. Hei 2-83228 discloses an optical element which is composed of a graded refractive index lens element and a diffraction grating, this diffraction grating has no function of a lens.

The lens system according to the present invention may be not only a lens system which is composed only on the graded refractive index lens element and the diffraction type lens element but also a lens system which comprises homogenous lens element or elements in addition to the graded refractive index lens element and the diffraction type lens element.

DETAILED DESCRIPTION OF THE PREFERRED EMBODIMENTS

Now, the lens system according to the present invention will be described more detailedly below with reference to the preferred embodiments illustrated in the accompanying drawings.

Figure 1:
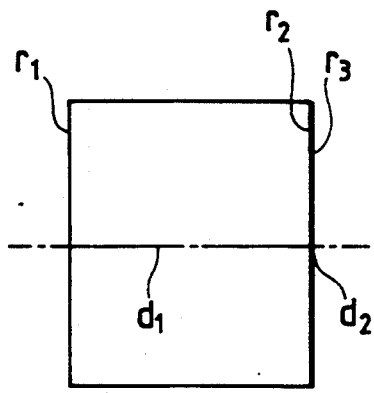
FIG. 1 shows a sectional diagram illustrating composition of Embodiment 1 of the lens system according to the present invention.

The Embodiment 1 is a lens system comprising a graded refractive index lens element which has a diffraction type lens element formed on one of the refractive surfaces thereof. Speaking more concretely, the Embodiment 1 is a lens system consisting, as shown in FIG. 1, of a single radial type graded refractive index lens element which has planar surfaces on both the sides and a diffraction type lens element formed on the emergence side refracting surface, and is designed with the following numerical data:

| | | |
|---|---|---|
| f = 20.0, | F/2.0 | |
| $r_1 = \infty$ | | |
| $d_1 = 10.0$ | $n_1$ = refractive index of the graded refractive index lens element | |
| $r_2 = \infty$ | | |
| $d_2 = 0.0$ | $n_2$ = refractive index of the diffraction type lens element | |
| $r_3 = 1.028 \times 10^6$ | | |
| (graded refractive index lens element) | | |
| | $N_0$ | $N_1$ | $N_2$ |
| d line | 1.72151 | $-0.21629 \times 10^{-2}$ | $0.17860 \times 10^{-5}$ |
| C line | 1.71436 | $-0.21269 \times 10^{-2}$ | $0.17860 \times 10^{-5}$ |
| F line | 1.73904 | $-0.22471 \times 10^{-2}$ | $0.17860 \times 10^{-5}$ |
| | $v_0$ 29.23460 | $v_1$ 0.18000 $\times 10^2$ | |
| | | $(N_3, N_4, \ldots = 0)$ | |
| $\phi_D = 0.010$ | | |
| $\phi_G = 0.041, \Delta n = 0.053$ | | |
| $\Sigma\phi_D/\Sigma\phi_G = 0.24$ | | | wherein the reference symbols $r_1, \ldots$ represent the radii of curvature on the surfaces of the respective lens elements, the reference symbols $d_1, \ldots$ designate the thicknesses of the respective lens elements and the airspace(s) reserved therebetween, the reference symbols $n_1, \ldots$ denote the refractive indices of the respective lens elements, and the reference symbols $v_1, \ldots$ represent the Abbe's numbers of the respective lens elements.

The diffraction type lens elements (having the refractive indices $n_2$) are equivalent to ordinary lens elements which have very high imaginary refractive indices as described in the literature SPIE, Vol. 126, pages 46 and later.

Therefore, the radii of curvature r, thicknesses d and refractive indices n of the diffraction type lens elements are respresented, in the numerical data listed above, as those of ordinary lens elements which are equivalent to the diffraction type lens elements in the optical performance thereof including aberrations to be produced thereby. In addition, though the numerical data do not list the refractive indices and Abbe's numbers of all the diffraction type lens elements used in the embodiments, the diffraction type lens elements used therein has a refractive index $n=1,000$ and an Abbe's number $v=-3.45$ unless otherwise specified.

Figure 2:
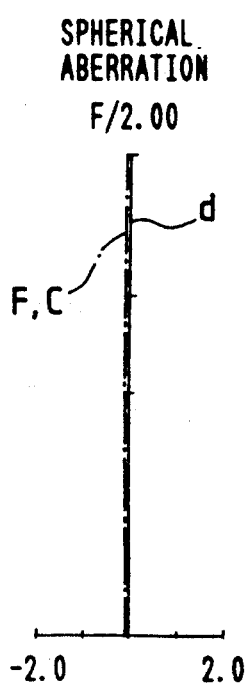
FIG. 2 shows graphs illustrating aberration characteristics of the Embodiment 1 of the present invention.

Aberration characteristics of the Embodiment 1 are illustrated in FIG. 2.

A lens system which is designed for the same specifications as those of the Embodiment 1 and with the numerical data listed below has spherical aberration visualized in FIG. 3.

---

$f = 20.0, \quad F/2.0$
$r_1 = \infty$
$d_1 = 10.0 \quad n_1 = $ refractive index of the graded refractive index lens element
$r_2 = \infty$
(graded refractive index lens element)

|        | $N_0$    | $N_1$                    | $N_2$                   |
|--------|----------|--------------------------|-------------------------|
| d line | 1.72151  | $-0.26321 \times 10^{-2}$ | $0.19674 \times 10^{-5}$ |
| C line | 1.71436  | $-0.25882 \times 10^{-2}$ | $0.19674 \times 10^{-5}$ |
| F line | 1.73904  | $-0.27345 \times 10^{-2}$ | $0.19674 \times 10^{-5}$ |
|        | $v_0$ 29.23460 | $v_1$ $0.18000 \times 10^2$ | |

$\phi_G = 0.050, \Delta n = 0.065$

---

Figure 3:
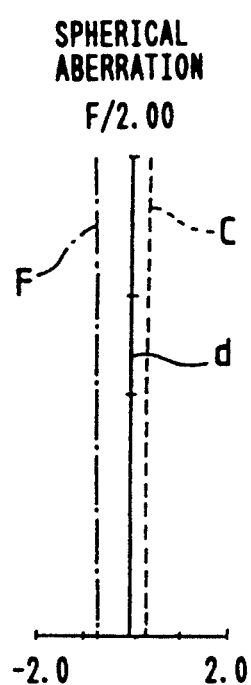
FIG. 3 shows graphs illustrating aberration characteristics of a lens system which has the composition similar to that of the Embodiment 1 but uses no diffraction type lens element.

As is seen from FIG. 2 and FIG. 3, the Embodiment 1 of the present invention which consists of the combination of the graded refractive index lens element and the diffraction type lens element has longitudinal chromatic aberration far less than that in the lens system designed with the numerical data listed above. In the lens system according to the present invention which uses the diffraction type lens element, the refractive power of the lens system as a whole is shared with the diffraction type lens element so as to make it sufficient to impart a weaker refractive power to the graded refractive index lens element, thereby making it possible to reduce the refractive index difference $\Delta n$ in the graded refractive index lens element and providing a great advantage for preparing the material of this lens element.

The Embodiment 1 may be composed by forming the diffraction type lens element on a plane parallel plate and combining it with the radial type graded refractive index lens element. Further, aberrations can be controlled more easily by designing the diffraction type lens element not as the lens element equivalent to a spherical lens element as described above, but as a lens element which is equivalent to an aspherical lens element.

Figure 4:
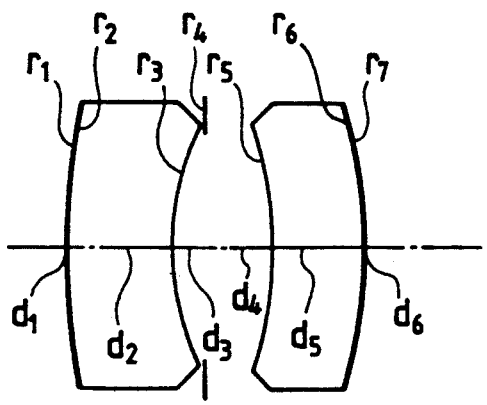
FIG. 4 shows a sectional view illustrating composition of Embodiment 2 of the lens system according to the present invention.

The Embodiment 2 has the composition illustrated in FIG. 4, wherein the lens system according to the present invention comprises two radial type graded refractive index lens elements, a diffraction type lens element formed on the object side surface of the graded refractive index lens element arranged on the object side and another diffraction type lens element formed on the image side surface of the graded refractive index lens element arranged on the image side. In other words, the Embodiment 2 comprises, in the order from the object side, a first meniscus-shaped graded refractive index lens element and a second meniscus-shaped graded refractive index lens element; the incidence side surface of the first lens element and the emergence side surface of the second lens element being designed as diffraction type lens elements respectively. The Embodiment 2 has the numerical data which are listed below:

---

$f = 50.0, \quad F/1.8$
maximum image height 21.6, half field angle 23.5°
$r_1 = 74.9949$
$d_1 = 0.0000 \quad n_1 = $ refractive index of the first diffraction type lens element
$r_2 = 74.9963$
$d_2 = 10.6527 \quad n_2 = $ refractive index of the first graded refractive index lens element
$r_3 = 25.8762$
$d_3 = 3.5915$
$r_4 = \infty$ (stop)
$d_4 = 7.2551$
$r_5 = -38.8562$
$d_5 = 9.4755 \quad n_3 = $ refractive index of the second graded refractive index lens element
$r_6 = -47.9843$
$d_6 = 0.0000 \quad n_4 = $ refractive index of the second diffraction type lens element
$r_7 = -47.9836$
(graded refractive index lens element)

object side

|        | $N_0$    | $N_1$                    |
|--------|----------|--------------------------|
| d line | 1.72151  | $-0.10428 \times 10^{-2}$ |
| C line | 1.71436  | $-0.10254 \times 10^{-2}$ |
| F line | 1.73904  | $-0.10833 \times 10^{-2}$ |
|        | $v_0$ 29.23460 | $v_1 \times 10^2$ 0.18000 |

|        | $N_2$                    | $N_3$                    |
|--------|--------------------------|--------------------------|
| d line | $0.91426 \times 10^{-6}$ | $-0.10385 \times 10^{-9}$ |
| C line | $0.91426 \times 10^{-6}$ | $-0.10385 \times 10^{-9}$ |
| F line | $0.91426 \times 10^{-6}$ | $-0.10385 \times 10^{-9}$ |

$(N_4, N_5, \ldots = 0)$ image side

|        | $N_0$    | $N_1$                    |
|--------|----------|--------------------------|
| d line | 1.72151  | $-0.79260 \times 10^{-3}$ |
| C line | 1.71436  | $-0.77939 \times 10^{-3}$ |
| F line | 1.73904  | $-0.82342 \times 10^{-3}$ |
|        | $v_0$ 29.23460 | $v_1 \times 10^2$ 0.18000 |

|        | $N_2$                    | $N_3$                    |
|--------|--------------------------|--------------------------|
| d line | $0.51028 \times 10^{-7}$ | $-0.33306 \times 10^{-9}$ |
| C line | $0.51028 \times 10^{-7}$ | $-0.33306 \times 10^{-9}$ |
| F line | $0.51028 \times 10^{-7}$ | $-0.33306 \times 10^{-9}$ |

$\phi_D = 0.002, 0.003$
$\phi_G = 0.22, 0.015$
$\Delta n = 0.170, 0.160$
$\Sigma\phi_D/\Sigma\phi_G = 0.14$

---

Figure 5:
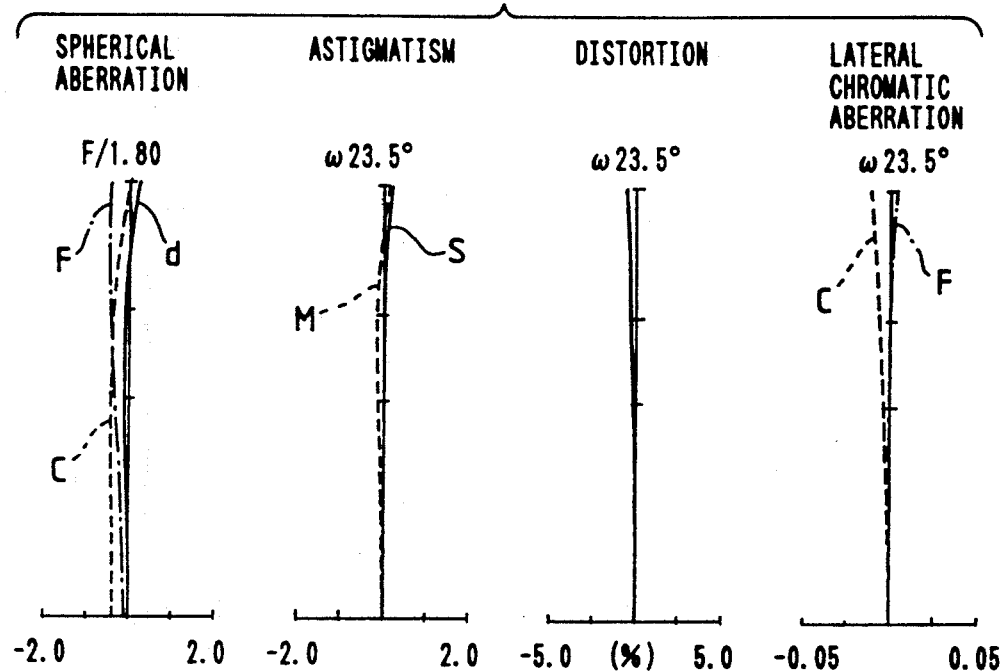
FIG. 5 shows graphs illustrating aberration characteristics of the Embodiment 2 of the present invention.

Aberration characteristics of the Embodiment 2 are visualized in FIG. 5.

Figure 6:
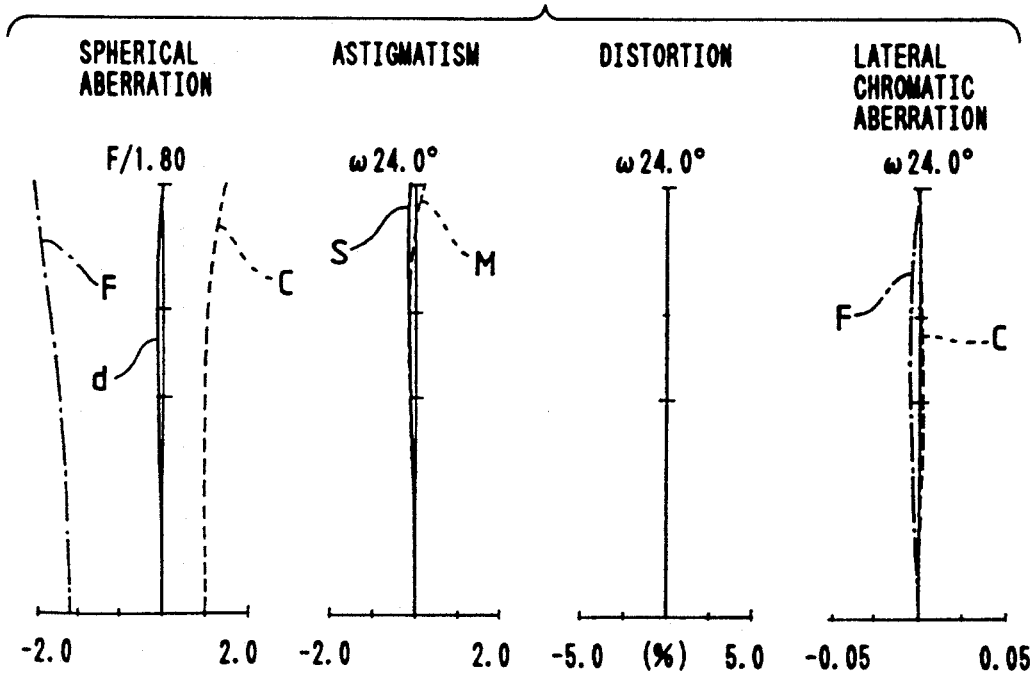
FIG. 6 shows curves illustrating aberration characteristics of a lens system which has the composition similar to that of the Embodiment 2 but uses no diffraction type lens element.

FIG. 6 shows aberration characteristics of a lens system which is designed, without using the diffraction type lens elements, for the same specifications as those of the Embodiment 2 and with the numerical data listed below:

---

$f = 50.0, \quad F/1.8$
maximum image height 21.6, half field angle 23.4°
$r_1 = 75.1095$ -continued $d_1 = 10.6560$  $n_1$ = refractive index of the graded refractive index lens element
$r_2 = 25.0620$
$d_2 = 3.6000$
$r_3 = \infty$ (stop)
$d_3 = 7.0298$
$r_4 = -41.0685$
$d_4 = 9.4642$  $n_2$ = refractive index of the graded refractive index lens element
$r_5 = -45.7069$
(graded refractive index lens element)
object side

| | $N_0$ | $N_1$ |
|---|---|---|
| d line | 1.72151 | $-0.12526 \times 10^{-2}$ |
| C line | 1.71436 | $-0.12317 \times 10^{-2}$ |
| F line | 1.73904 | $-0.13013 \times 10^{-2}$ |
| | $v_0$ 29.23460 | $v_1 \times 10^2$ |
| | | 0.18000 |

| | $N_2$ | $N_3$ |
|---|---|---|
| d line | $0.10905 \times 10^{-5}$ | $-0.43448 \times 10^{-9}$ |
| C line | $0.10905 \times 10^{-5}$ | $-0.43448 \times 10^{-9}$ |
| F line | $0.10905 \times 10^{-5}$ | $-0.43448 \times 10^{-9}$ | image side

| | $N_0$ | $N_1$ |
|---|---|---|
| d line | 1.72151 | $-0.81124 \times 10^{-3}$ |
| C line | 1.71436 | $-0.79772 \times 10^{-3}$ |
| F line | 1.73904 | $-0.84279 \times 10^{-3}$ |
| | $v_0$ 29.23460 | $v_1 \times 10^2$ |
| | | 0.18000 |

| | $N_2$ | $N_3$ |
|---|---|---|
| d line | $0.43705 \times 10^{-7}$ | $0.40694 \times 10^{-10}$ |
| C line | $0.43705 \times 10^{-7}$ | $0.40694 \times 10^{-10}$ |
| F line | $0.43705 \times 10^{-7}$ | $0.40694 \times 10^{-10}$ |

$\phi_G = 0.026, 0.015$
$\Delta n = 0.207, 0.157$

The Embodiment 2, like the Embodiment 1, has longitudinal chromatic aberration which is remarkably reduced by using the diffraction type lens elements and makes it possible to reduce refractive index differences in the graded refractive index lens elements.

In the Embodiment 2 also, it is possible to form the diffraction type lens elements not on the refracting surfaces of the graded refractive index lens elements but on refracting surfaces of a plane parallel plate or design the diffraction type lens elements so as to have the functions similar to those of aspherical lens elements.

Figure 7:
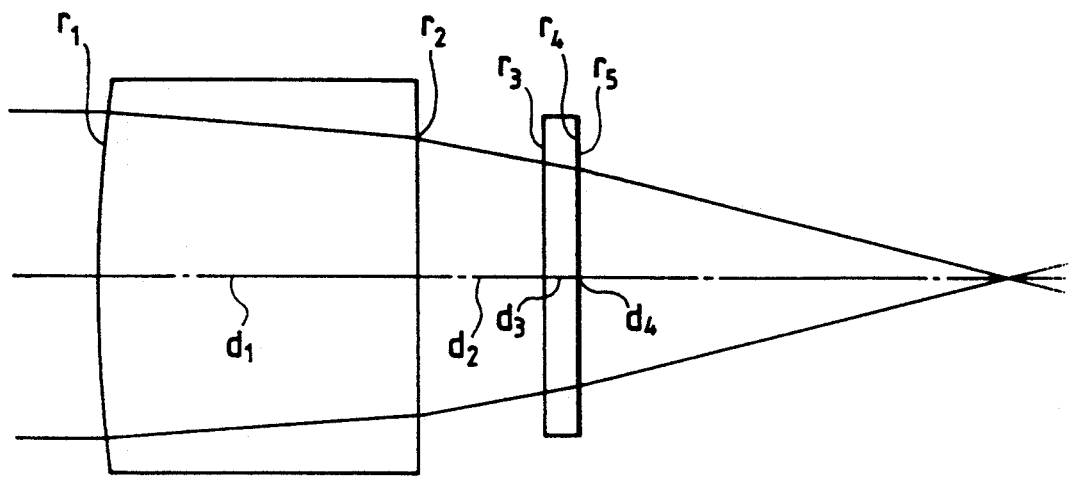
FIG. 7 shows a sectional view illustrating composition of Embodiment 3 of the lens system according to the present invention.

The Embodiment 3 is an example wherein a graded refractive index lens element and a diffraction type lens element are arranged with an airspace reserved therebetween. The Embodiment 3 is composed, as shown in FIG. 7, of a combination consisting of a plano-convex radial type graded refractive index lens element having a planar surface on one side and a plane parallel plate having a diffraction type lens element formed thereon, and designed with the numerical data listed below:

$f = 20.0,$  F/2.0
$r_1 = 40.0$
$d_1 = 10.0$  $n_1$ = refractive index of the graded refractive index lens element
$r_2 = \infty$
$d_2 = 4.0$
$r_3 = \infty$
$d_3 = 1.0$  $n_2 = 1.51633$  $v_2 = 64.15$
$r_4 = \infty$
$d_4 = 0.0$  $n_3$ = refractive index of the diffraction type lens element
$r_5 = 4.866 \times 10^5$
(graded refractive index lens element)

| | $N_0$ | $N_1$ | $N_2$ |
|---|---|---|---|
| d line | 1.72151 | $-0.97620 \times 10^{-3}$ | $0.75332 \times 10^{-7}$ |
| C line | 1.71436 | $-0.93959 \times 10^{-3}$ | $0.75332 \times 10^{-7}$ |
| F line | 1.73904 | $-0.10616 \times 10^{-2}$ | $0.75332 \times 10^{-7}$ |
| | $v_0$ 29.23460 | $v_1$ 0.80000 $\times 10$ | |

-continued $(N_3, N_4, \ldots = 0)$
$\phi_D = 0.021$
$\phi_G = 0.019, \Delta n = 0.024$
$\Sigma\phi_D/\Sigma\phi_G = 1.07$ In the Embodiment 3, the diffraction type lens element and the graded refractive index lens element are designed separately so that the lens system according to the present invention can be manufactured easily in practice.

Figure 8:
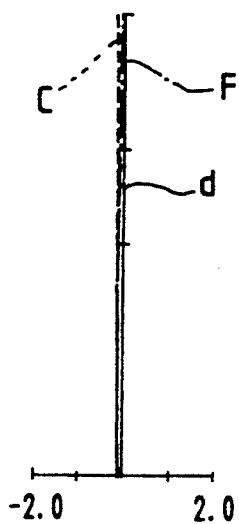
FIG. 8 shows curves illustrating aberration characteristics of the Embodiment 3 of the present invention.

Aberration characteristics of the Embodiment 3 is visualized in FIG. 8.

Figure 9:
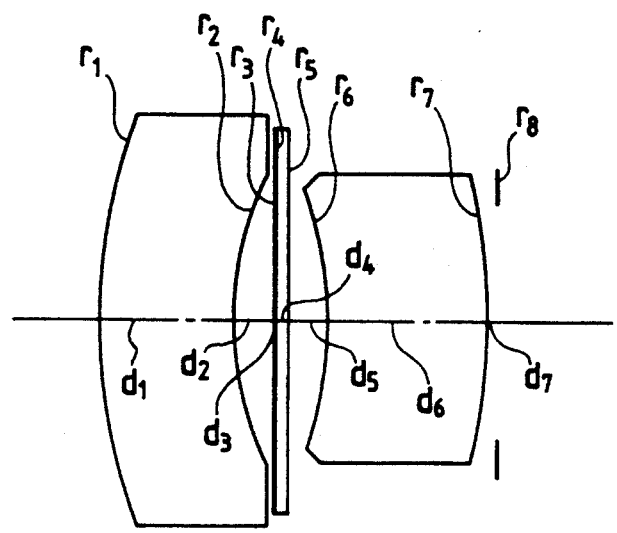
FIG. 9 shows a sectional view illustrating composition of Embodiment 4 of the lens system according to the present invention.

The Embodiment 4 is an example wherein graded refractive index lens elements and a diffraction type lens element are arranged with airspaces reserved therebetween. As shown in FIG. 9, the Embodiment 4 comprises two graded refractive index lens elements, and a plane parallel plate which is arranged between the graded refractive index lens elements and has a diffraction type lens element formed thereon.

Speaking more concretely, the Embodiment 4 comprises a first graded refractive index lens element having a meniscus shape, a second graded refractive index lens element having a meniscus shape and a diffraction type lens element arranged between the two graded refractive index lens elements. The Embodiment 4 has the following numerical data:

$f = 50.0,$  F/2.0
maximum image height 21.6, half field angle 23.3°
$r_1 = 45.5254$
$d_1 = 10.1111$  $n_1$ = refractive index of the first graded refractive index lens element
$r_2 = 26.4833$
$d_2 = 3.2987$
$r_3 = 6.817 \times 10^6$
$d_3 = 0.0000$  $n_2$ = refractive index of the diffraction type lens element
$r_4 = \infty$
$d_4 = 1.0000$  $n_3 = 1.51633$  $v_3 = 64.15$
$r_5 = \infty$
$d_5 = 3.0818$
$r_6 = -33.1799$
$d_6 = 12.3677$  $n_4$ = refractive index of the second graded refractive index lens element
$r_7 = -55.0417$
$d_7 = 1.0000$
$r_8 = \infty$ (stop)
(graded refractive index lens element)
object side

| | $N_0$ | $N_1$ | $N_2$ |
|---|---|---|---|
| d line | 1.72000 | $-0.10326 \times 10^{-2}$ | $0.23507 \times 10^{-6}$ |
| C line | 1.71568 | $-0.10264 \times 10^{-2}$ | $0.23507 \times 10^{-6}$ |
| F line | 1.73001 | $-0.10470 \times 10^{-2}$ | $0.23507 \times 10^{-6}$ |
| | $v_0$ 50.24424 | $v_1$ 0.50000 $\times 10^2$ | |
| | | $(N_3, N_4, \ldots = 0)$ | | image side

| | $N_0$ | $N_1$ | $N_2$ |
|---|---|---|---|
| d line | 1.72000 | $-0.72643 \times 10^{-3}$ | $0.34927 \times 10^{-6}$ |
| C line | 1.71568 | $-0.72207 \times 10^{-3}$ | $0.34927 \times 10^{-6}$ |
| F line | 1.73001 | $-0.73660 \times 10^{-3}$ | $0.34927 \times 10^{-6}$ |
| | $v_0$ 50.24424 | $v_1$ 0.50000 $\times 10^2$ | |
| | | $(N_3, N_4, \ldots = 0)$ | |

$\phi_D = 0.0015$
$\phi_G = 0.020, 0.018$
$\Delta n = 0.235, 0.083$
$\Sigma\phi_D/\Sigma\phi_G = 0.039$ In the Embodiment 4 also, the diffraction type lens element is separated from each of the graded refractive index lens elements so that the lens system according to the present invention can be manufactured easily in practice. Further, both the longitudinal chromatic aberration and the lateral chromatic aberration are corrected with a single diffraction type lens element in the Embodiment 4 by arranging an aperture stop after the lens system and interposing the diffraction type lens element between the two graded refractive index lens elements.

Figure 10:
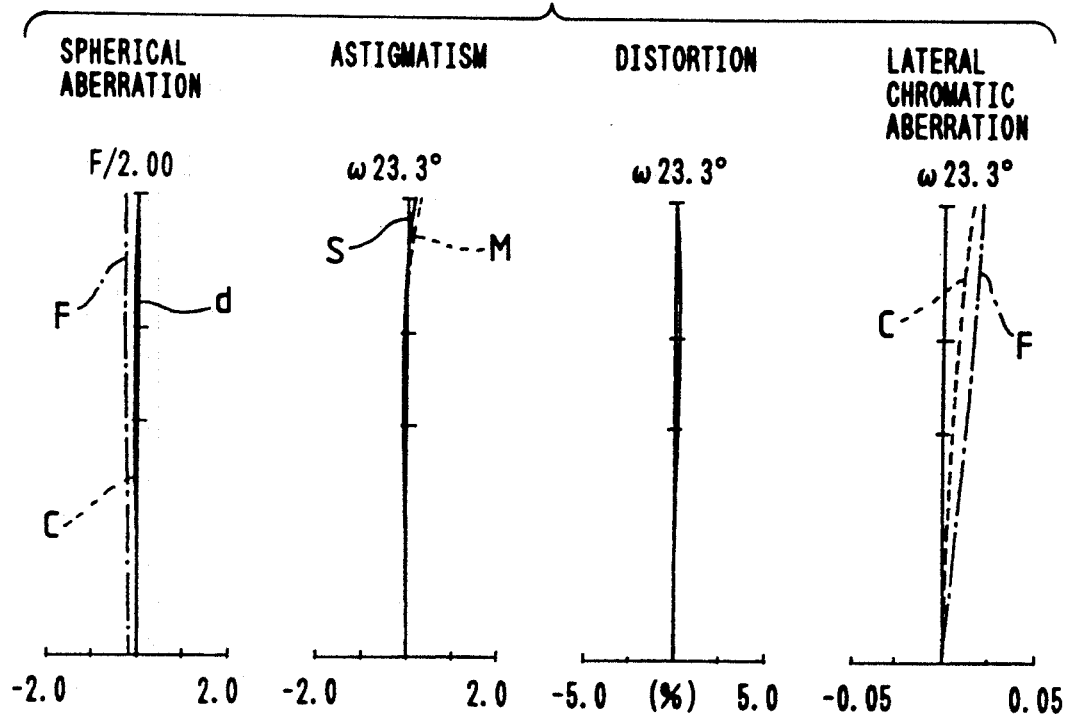
FIG. 10 show graphs illustrating aberration characteristics of the Embodiment 4 of the present invention.

Aberration characteristics of the Embodiment 4 are illustrated in FIG. 10.

Furthermore, it is possible to design either of the graded refractive index lens elements as a plano-concave lens element and form the diffraction type lens element on the planar surface. In such a case, either the surface of incidence or surface of emergence may be designed as the planar surface.

The lens system according to the present invention, which uses the combination of radial type graded refractive index lens element and the diffraction type lens element so as to share the refractive power of the lens system as a whole with the diffraction type lens element, permits weakening the refractive power to be imparted to the radial type graded refractive index lens element and reducing the difference in refractive index to be reserved in the radial type graded refractive index lens element, thereby making it possible to manufacture the radial type graded refractive index lens element by using a material which is easily be available in practice. Further, the lens system according to the present invention has chromatic aberration and the other aberrations which are corrected favorably by utilizing the capability of the diffraction type lens element for correcting chromatic aberration.

I claim:

1. A lens system comprising a graded refractive index lens element having refractive index n(y) varying in the direction perpendicular to an optical axis as expressed by the formula shown below and a diffraction type lens element arranged coaxially therewith; and adapted to satisfy the following conditions (1) and (2):

$$n(y) = N_0 + N_1 y^2 + N_2 y^4 + \cdots$$

$$v_1 < v_0 \qquad (1)$$

$$0.01 < \Sigma \phi_D / \Sigma \phi_G < 1.2 \qquad (2)$$

wherein the reference symbol y represents the distance as measured from the optical axis to a lens portion of interest in the direction perpencidular to the optical axis, the reference symbol $N_0$ designates the refractive index of the graded refractive index lens element as measured on the optical axis, the reference symbols $N_1$, $N_2$, ... designate the refractive index distribution coefficients, the reference symbol $v_0$ denotes the Abbe's number of the graded refractive index lens element as measured on the optical axis, the reference numeral $v_1$ represents the Abbe's number of the graded refractive index lens element determined from the refractive index distribution coefficient of the second order, the reference symbol $\phi_G$ designates the refractive power of the graded refractive index lens element and the reference symbol $\phi_D$ denotes the refractive power of the diffraction type lens element.

2. A lens system according to claim 1 wherein said diffraction type lens element is arranged on a refractive surface of said graded refractive index lens element.

3. A lens system according to claim 1 wherein said graded refractive index lens element and said diffraction type lens element are arranged with an airspace reserved therebetween.

4. A lens system according to claim 2 wherein said graded refractive index lens element has a planar surface of incidence and a planar surface of emergence, and said diffraction type lens element is arranged on the surface of incidence or the surface of emergence.

5. A lens system according to claim 3 wherein said graded refractive index lens is a plano-convex lens element and said diffraction type lens element is arranged on the emergence side of said graded refractive index element.

6. A lens system comprising a first lens element designed as a graded refractive index lens element having a diffraction type lens element on the incidence side surface thereof and a second lens element designed as a graded refractive index lens element having a diffraction type lens element on the emergence side surface thereof, the refractive index n(y) of each said graded refractive index lens element being expressed by the following formula, and said lens system satisfying the following conditions (1) and (2):

$$n(y) = N_0 + N_1 y^2 + N_2 y^4 + \cdots$$

$$v_1 < v_0 \qquad (1)$$

$$0.01 < \Sigma \phi_D / \Sigma \phi_G < 1.2 \qquad (2)$$

wherein the reference symbol y represents the distance as measured from an optical axis to a lens portion of interest in the direction perpendicular to the optical axis, the reference symbol $N_0$ designates the refractive index of the graded refractive index lens element as measured on the optical axis, the reference symbols $N_1$, $N_2$, ... designate the refractive index distribution coefficients, the reference symbol $v_0$ denotes the Abbe's number of the graded refractive index lens element as measured on the optical axis, the reference numeral $v_1$ represents the Abbe's number of the graded refractive index lens element determined from the refractive index distribution coefficient of the second order, the reference symbol $\phi_G$ designates the refractive power of the graded refractive index lens element and the reference symbol $\phi_D$ denotes the refractive power of the diffraction type lens element.

7. A lens system comprising a first graded refractive index lens element, a second graded refractive index lens element and a diffraction type lens element arranged between said graded refractive index lens elements with airspaces interposed, the refractive index n(y) of each said graded refractive index lens element being expressed by the following formula, and said lens system satisfying the following conditions (1) and (2):

$$n(y) = N_0 + N_1 y^2 + N_2 y^4 + \cdots$$

$$v_1 < v_0 \qquad (1)$$

$$0.01 < \Sigma \phi_D / \Sigma \phi_G < 1.2 \qquad (2)$$

wherein the reference symbol y represents the distance as measured from an optical axis to a lens portion of interest in the direction perpendicular to the optical axis, the reference symbol $N_0$ designates the refractive index of the graded refractive index lens element as measured on the optical axis, the reference symbols $N_1$, $N_2$, ... designate the refractive index distribution coefficients, the reference symbol $v_0$ denotes the Abbe's number of the graded refractive index lens element as measured on the optical axis, the reference numeral $\nu_1$ represents the Abbe's number of the graded refractive index lens element determined from the refractive index distribution coefficient of the second order, the reference symbol $\phi_G$ designates the refractive power of the graded refractive index lens element and the reference symbol $\phi_D$ denotes the refractive power of the diffraction type lens element.

* * * * *